US008488813B2

(12) United States Patent
Martin et al.

(10) Patent No.: US 8,488,813 B2
(45) Date of Patent: Jul. 16, 2013

(54) RECONFIGURABLE ACOUSTIC TRANSDUCER DEVICE

(75) Inventors: Steven Martin, Fort Collins, CO (US); Atul Goel, Fort Collins, CO (US); Osvaldo Buccafusca, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 932 days.

(21) Appl. No.: 12/416,447

(22) Filed: Apr. 1, 2009

(65) Prior Publication Data

US 2010/0254550 A1 Oct. 7, 2010

(51) Int. Cl.
*H02B 1/00* (2006.01)

(52) U.S. Cl.
USPC .......... 381/123

(58) Field of Classification Search
CPC .......... G01F 1/667; G01F 1/662
USPC .......... 381/123
See application file for complete search history.

(56) References Cited

U.S. PATENT DOCUMENTS

| | | | | |
|---|---|---|---|---|
| 5,115,416 | A * | 5/1992 | Gehlbach et al. | 367/138 |
| 5,329,930 | A * | 7/1994 | Thomas et al. | 600/447 |
| 5,635,619 | A * | 6/1997 | Udpa et al. | 73/1.82 |
| 5,897,501 | A | 4/1999 | Wildes et al. | |
| 6,015,383 | A * | 1/2000 | Buhler et al. | 600/437 |
| 6,457,371 | B1 * | 10/2002 | Feller | 73/861.29 |
| 2002/0077673 | A1 * | 6/2002 | Penner et al. | 607/60 |
| 2004/0050166 | A1 * | 3/2004 | Batzinger et al. | 73/614 |
| 2004/0204122 | A1 * | 10/2004 | Opela et al. | 455/565 |
| 2004/0204744 | A1 * | 10/2004 | Penner et al. | 607/23 |
| 2004/0210137 | A1 * | 10/2004 | Baba et al. | 600/443 |
| 2004/0236253 | A1 * | 11/2004 | Vortman et al. | 601/2 |
| 2005/0022601 | A1 * | 2/2005 | Blakley | 73/612 |
| 2006/0193270 | A1 * | 8/2006 | Gehasie et al. | 370/282 |
| 2006/0267772 | A1 * | 11/2006 | Knadle et al. | 340/572.4 |
| 2007/0142728 | A1 * | 6/2007 | Penner et al. | 600/486 |
| 2007/0149245 | A1 * | 6/2007 | Berman et al. | 455/556.1 |
| 2007/0167781 | A1 | 7/2007 | Vortman et al. | |
| 2007/0175502 | A1 * | 8/2007 | Sliwa et al. | 134/184 |
| 2008/0042519 | A1 | 2/2008 | Marshall et al. | |
| 2008/0205668 | A1 | 8/2008 | Torii et al. | |
| 2009/0235748 | A1 * | 9/2009 | Geir et al. | 73/597 |
| 2010/0232623 | A1 * | 9/2010 | Martin et al. | 381/96 |

* cited by examiner

*Primary Examiner* — Robert J Hoffberg
*Assistant Examiner* — Igwe U Anya

(57) ABSTRACT

A device comprises: a first acoustic transducer; a second acoustic transducer; one or more transducer drivers; one or more signal receivers; and a transducer configuration device for selectively configuring connections between: (1) at least one of the first and second acoustic transducers; and (2) the one or more transducer drivers and the one or more signal receivers, according to a selected operating mode for the device among a plurality of possible operating modes.

20 Claims, 8 Drawing Sheets

RECONFIGURABLE ACOUSTIC TRANSDUCER DEVICE

BACKGROUND

Acoustic transducers are employed in a number of applications. In some applications, the acoustic transducers only transmit acoustic signals. In other applications, the acoustic transducers only receive acoustic signals. In still other applications, acoustic transducers transmit acoustic signals and receive acoustic signals. Furthermore, within these general applications, there are varying requirements for the power levels to be delivered to and/or received by the transducers.

For an acoustic transducer manufacturer, it is advantageous to have a minimum number of different products that meet a maximum number of possible applications. Different applications will require varying transmit powers, receive sensitivities, and detection schemes. Additionally, some applications might benefit from a dynamically configurable device which can adapt to changing operating requirements So it would be desirable to provide an acoustic transducer module or other device which can be employed in a wide variety of applications with different, and perhaps, changing operating requirements. It would further be desirable to provide such a device which can be configured by an "end-user" of the device. It would also be desirable to provide a method of adapting such a device for use in a wide variety of applications with different, and perhaps, changing operating requirements.

SUMMARY

In a representative embodiment, a device comprises: a first acoustic transducer; a second acoustic transducer; a first transducer driver; a second transducer driver; a first signal receiver; a second signal receiver; a first switching device having a first terminal connected to the first transducer driver, a second terminal connected to the first signal receiver, and a common terminal connected to the first acoustic transducer; a second switching device having a first terminal connected to the second transducer driver, a second terminal connected to the second signal receiver, and a common terminal connected to the second acoustic transducer; a first transducer configuration storage device configured to select a configuration of the first switching device; a second transducer configuration storage device configured to select a configuration of the second switching device. Beneficially, the first and second acoustic transducer, the first and second signal receivers, the first and second switching devices, and the first and second transducer configuration storage devices are all included within a same housing.

In another representative embodiment, a device comprises: a first acoustic transducer; a second acoustic transducer; one or more transducer drivers; one or more signal receivers; and a transducer configuration device for selectively configuring connections between: (1) at least one of the first and second acoustic transducers; and (2) the one or more transducer drivers and the one or more signal receivers, according to a selected operating mode for the device among a plurality of possible operating modes for which the acoustic transducer device could be configured.

In another representative embodiment, a method is provided for operating an acoustic transducer device having: a first acoustic transducer, a second acoustic transducer, one or more transducer drivers, and one or more signal receivers. The method includes: determining a selected operating mode for the acoustic transducer device among a plurality of possible operating modes for which the acoustic transducer device could be configured, based on one of: (1) an operating mode selection device internal to the acoustic transducer device, and (2) one or more voltages applied to configuration inputs of the acoustic transducer device. The method further includes selectively configuring connections between: (1) at least one of the first and second acoustic transducers; and (2) the one or more transducer drivers and the one or more signal receivers, according to the selected operating mode.

BRIEF DESCRIPTION OF THE DRAWINGS

The example embodiments are best understood from the following detailed description when read with the accompanying figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

Furthermore, as used herein, the term "acoustic" encompasses sonic, ultrasonic, and infrasonic. For example, a transmitting acoustic transducer may transmit sonic, and/or ultrasonic, and/or infrasonic waves. Also, unless otherwise noted, when a first device is said to be connected to, or coupled to, a node, signal, or second device, this encompasses cases where one or more intervening or intermediate devices may be employed to connect or couple the first device to the node, signal, or second device. However, when a first device is said to be "directly connected" or "directly coupled" to a node, signal, or second device, then it is understood that the first device is connected or coupled to the node, signal, or second device without any intervening or intermediate devices interposed therebetween.

Moreover, when used herein the context of describing a value or range of values, the terms "about" and "approximately" will be understood to encompass variations of +/−10% with respect to the nominal value or range of values.

Figure 1:
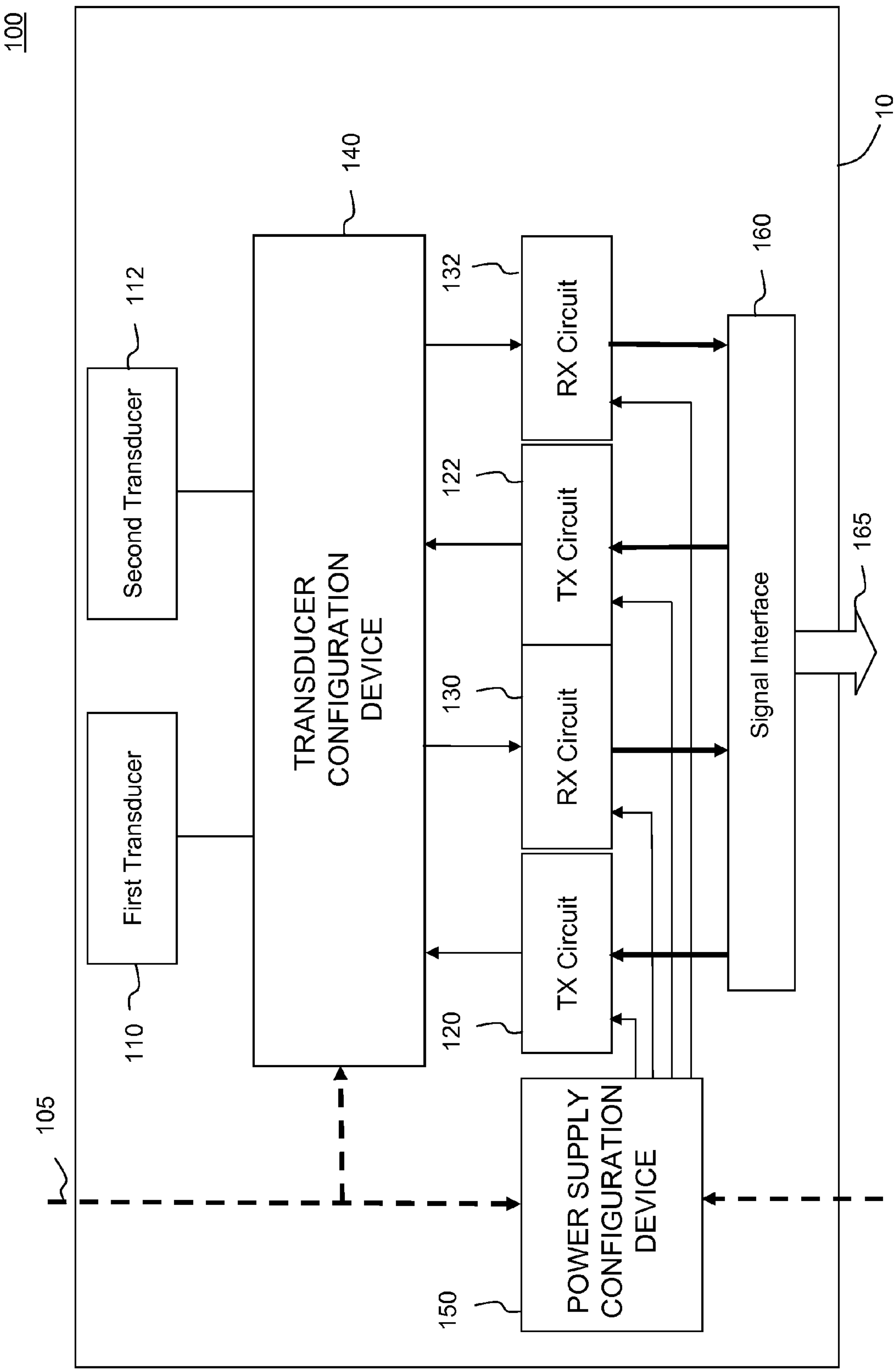
FIG. 1 is a block diagram illustrating one embodiment of an acoustic transducer device.

FIG. 1 is a block diagram illustrating one embodiment of an acoustic transducer module or acoustic transducer device 100. Acoustic transducer device 100 includes: a first acoustic transducer 110; a second acoustic transducer 112; a first transducer driver 120; a second transducer driver 122; a first signal receiver 130, a second signal receiver 132; a transducer configuration device 140; a power supply configuration device 150; and a signal interface 160. In a beneficial embodiment, acoustic transducer device 100 is provided within a housing 10.

First acoustic transducer 110 and second acoustic transducer 112 are each devices which are adapted to receive an electrical signal and in response thereto to transmit an acoustic wave and/or to receive an acoustic wave and in response thereto to output electrical signal. First and second acoustic transducers 110 and 112 need not be identical to each other. For example, they might operate at different frequencies or with different power levels (e.g., they might provide binary power weightings).

First transducer driver 120 and second transducer driver 122 each may include signal processing circuitry that processes a received control signal to output an electrical signal in a proper format for driving an acoustic transducer to transmit an acoustic wave. It should be noted that in some alternative embodiments, the acoustic transducer device may have only a single transducer driver that connects to first and second acoustic transducers 110 and 112 in a parallel or serial configuration. First signal receiver 130 and second signal receiver 132 each may include signal processing circuitry that processes a received electrical signal from an acoustic transducer to output an electrical signal in a proper format for subsequent processing by a device or devices connected to acoustic transducer device 100.

External signals 165 are communicated to/from first and second transducer drivers 120 and 122 and first and second signal receivers 130 and 132 via signal interface 160. For instance, in some embodiments, the package for acoustic transducer device 100 could have only three external pins—one for transmission (TX), one for reception (RX), and one for ground (or common). In that case, signal interface 160 can passively route signal(s) from first transducer driver 120 and/or second transducer driver 122 to the TX pin, and can route signal(s) from first signal receiver 130 and/or second signal receiver 132 to the RX pin. Some embodiments may omit signal interface 160.

Beneficially, acoustic transducer device 100 can be configured to operate in any one of a plurality of operating modes. Examples of such operating modes will be described in greater detail with respect to FIGS. 4-11 below.

In one embodiment, transducer configuration device 140 determines the selected operating mode for acoustic transducer device 100 among the plurality of possible operating modes for which acoustic transducer device 100 could be configured. In one arrangement, transducer configuration device 140 may include one or more transducer configuration storage devices. Examples of such configuration storage devices will be described in greater detail with respect to FIGS. 3A-C below. In another arrangement, acoustic transducer device 100 includes one or more configuration inputs 105 (e.g., external pins of a packaged device), and the selected operating mode is determined by one or more voltages applied to configuration input(s) 105.

Beneficially, transducer configuration device 140 selectively configures connections between: (1) at least one of first and second acoustic transducers 110 and 112; and (2) first and second transducer drivers 120 and 122 and/or first and second signal receivers 130 and 132, according to the selected operating mode. In some embodiments transducer configuration device 140 may include one or more logic circuits which receive user inputs via configuration input(s) 105 and provide one or more output signals for selecting the operating mode and configuring the connections between first and second acoustic transducers 110 and 112 and first and second transducer drivers 120 and 122 and/or first and second signal receivers 130 and 132.

Furthermore, in one embodiment, power supply configuration device 150 selectively connects a supply voltage to first and second transducer drivers 120 and 122 and/or first and second signal receivers 130 and 132, according to the selected operating mode of acoustic transducer device 100. Some embodiments may omit power supply configuration device 150.

Figure 2:
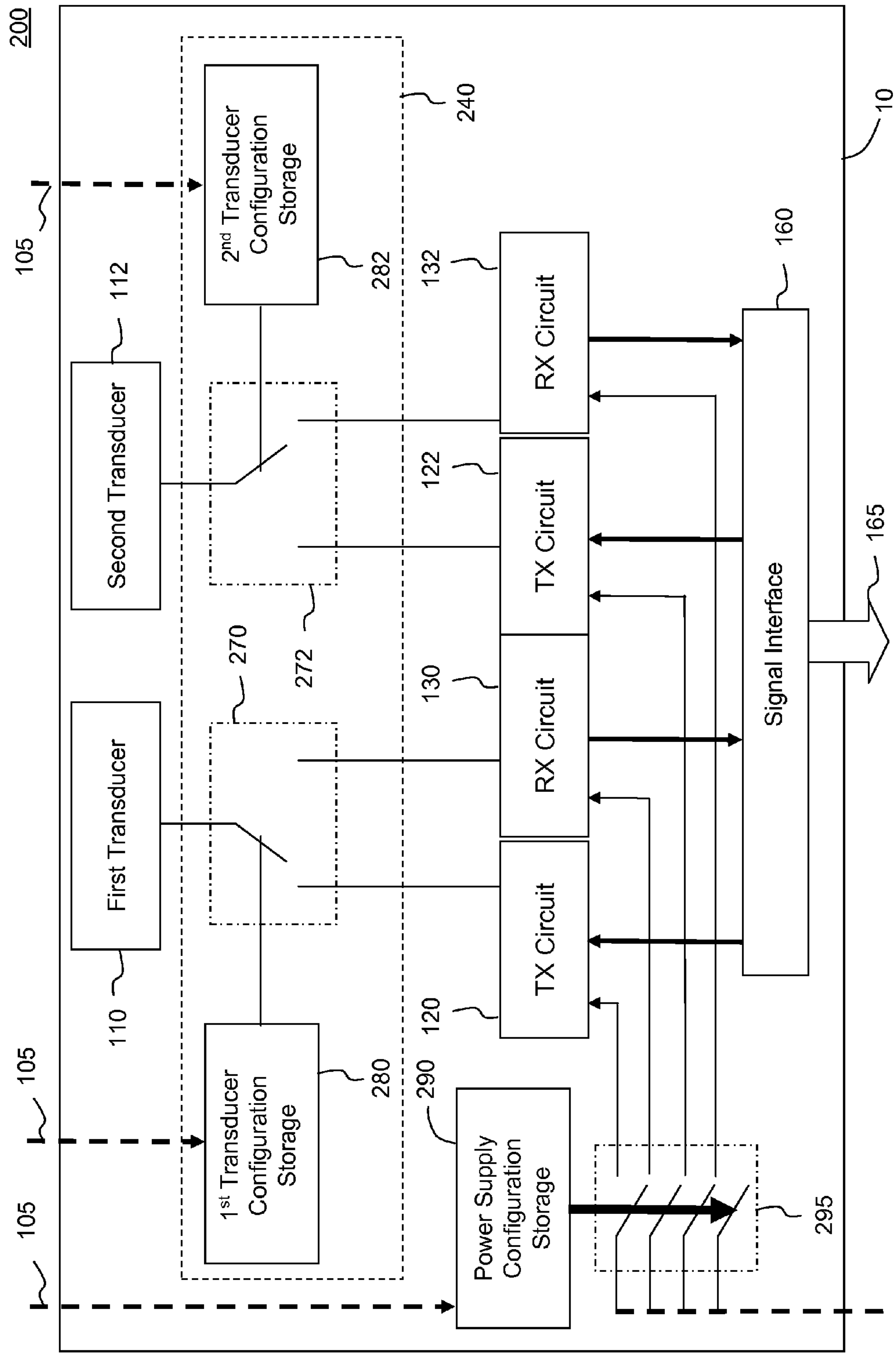
FIG. 2 is a block diagram illustrating one embodiment of an acoustic transducer device.

FIG. 2 is a block diagram illustrating one embodiment of an acoustic transducer module or acoustic transducer device 200. Acoustic transducer device 200 includes: first acoustic transducer 110; second acoustic transducer 112; first transducer driver 120; second transducer driver 122; first signal receiver 130, second signal receiver 132; signal interface 160; a first switching device 270; a second switching device 272; a first transducer configuration storage device 280; a second transducer configuration storage device 282; a power supply configuration storage device 290; and a supply voltage switching device 295.

Acoustic transducer device 200 may be one embodiment of acoustic transducer device 100. More specifically, first switching device 270; a second switching device 272; a first transducer configuration storage device 280; a second transducer configuration storage device 282 may be one embodiment of transducer configuration device 140, and power supply configuration storage device 290; and a supply voltage switching device 295 may be one embodiment of power supply configuration device 150.

First switching device 270 has a first terminal connected to first transducer driver 120, a second terminal connected to first signal receiver 130, and a common terminal connected to first acoustic transducer 110. Second switching device 272 has a first terminal connected to second transducer driver 122, a second terminal connected to second signal receiver 132, and a common terminal connected to second acoustic transducer 112. First transducer configuration storage device 280 is configured to select a configuration of first switching device 270, and second transducer configuration storage device 282 configured to select a configuration of second switching device 272. More specifically, in response to first transducer configuration storage device 280, first switching device 270 connects first acoustic transducer 110 to first transducer driver 120 or to first signal receiver 130, or in some embodiments, leaves first acoustic transducer 110 disconnected from both first transducer driver 120 and first signal receiver 130. Similarly, in response to second transducer configuration storage device 282, second switching device 272 connects second acoustic transducer 112 to second transducer driver 122 or to second signal receiver 132, or in some embodiments, leaves second acoustic transducer 112 disconnected from both second transducer driver 122 and second signal receiver 132.

Beneficially, first and second switching devices 270 and 272 each comprise a single-pole, double-throw (SPDT) switch. In other embodiments, first and second switching devices 270 and 272 could be combined into a double-pole, double-throw (DPDT) switch. Other arrangements are possible. First and second switching devices 270 and 272 can be any convenient switching devices, such as a FET switch, a diode switch, a CMOS switch, etc.

Figure 3C:
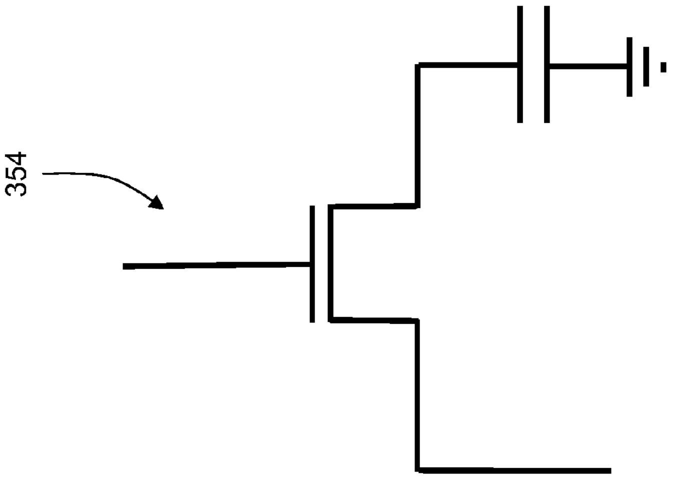
FIGS. 3A-C illustrates example embodiments of configuration storage devices.
Figure 3B:
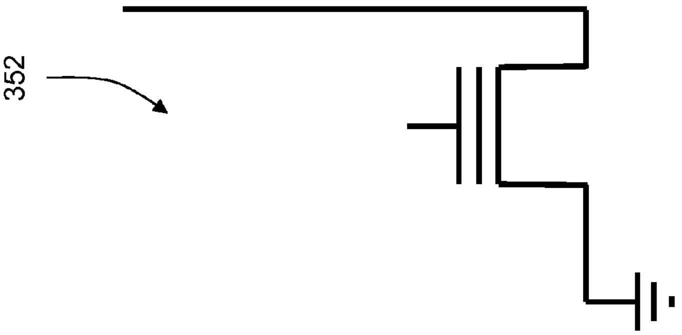
Figure 3A:
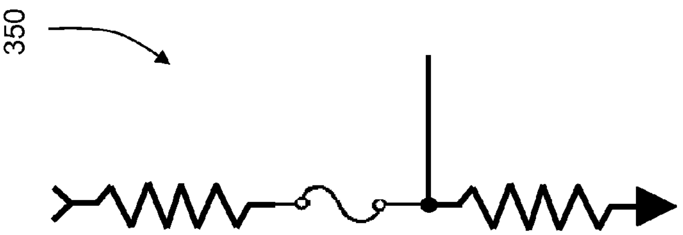

FIGS. 3A-C illustrates example embodiments of configuration storage devices. Configuration storage device 350 comprises a fuse. Configuration storage device 352 comprises a non-volatile memory device (e.g., a flash memory device). Configuration storage device 354 comprises a volatile memory device (e.g., a dynamic random access memory (DRAM) device). Beneficially, first transducer configuration storage device 280, second transducer configuration storage device 282, and power supply configuration storage device 290 may be realized by any of configuration storage devices 350, 352 and 354. Of course other embodiments of configuration storage devices are envisioned, and configuration storage devices 350, 352 and 354 are provided only as illustrative examples.

Turning back again to FIGS. 1 and 2, applications of acoustic transducer devices 100 and 200 will now be explained.

Acoustic transducer device 100 can be configured to operate in any one a plurality of different operating modes. In one embodiment, the configuration of acoustic transducer device 100 is static—that is, once it is configured for a selected operating mode, it remains so configured for its life. In that case, the operating mode may be "programmed" into acoustic transducer device 100 by a configuration storage device 350 such as the fuse, a bond wire connection, or other suitable means. In another embodiment, the configuration of acoustic transducer device 100 is dynamic—that is, its configuration may be changed from one selected operating mode to another selected operating mode. In that case, the operating mode may be "programmed" into acoustic transducer device 100 by a configuration storage device such as the configuration storage device 352, configuration storage device 354, one or more voltages applied to configuration input(s) (e.g., through external pins) 105, or other suitable means.

Transducer configuration device 140 routes signals between first and second acoustic transducers 110 and 112 and first and second transducer drivers 120 and 122 and first and second signal receivers 130 and 132 to configure acoustic transducer device 100 for the selected operating mode.

In some operating modes, one or more of first and second transducer drivers 120 and 122 and first and second signal receivers 130 and 132 may not be utilized by acoustic transducer device 100. In that case, beneficially power supply configuration device 150 may disconnect power from the unused driver(s) and/or receiver(s) to reduce the power consumption of acoustic transducer device 100.

Acoustic transducer device 200 also can be configured to operate in any one a plurality of different operating modes. In an embodiment where the configuration of acoustic transducer device 200 is static, first and second configuration storage devices 280 and 282 may each be the fuse, a bond wire connection, or other suitable means. In an embodiment where the configuration of acoustic transducer device 200 is dynamic, first and second configuration storage devices 280 and 282 may each be the configuration storage device 352, configuration storage device 354, one or more voltages applied to configuration input(s) (e.g., through external pins) 105, or other suitable means.

First switching device 270 routes signals between first acoustic transducer 110 and first transducer driver 120 and first signal receiver 130 to configure acoustic transducer device 200 for the selected operating mode. Similarly, second switching device 272 routes signals between second acoustic transducer 112 and second transducer driver 122 and second signal receiver 132 to configure acoustic transducer device 200 for the selected operating mode.

In operating modes where one or more of first and second transducer drivers 120 and 122 and/or first and second signal receivers 130 and 132 are not utilized by acoustic transducer device 200, supply voltage switching device 295 may disconnect power from the unused driver(s) and/or receiver(s) to reduce the power consumption of acoustic transducer device 200 in response to power supply configuration storage device 290.

Examples of operating modes for acoustic transducer device 100 and acoustic transducer device 200 will now be described with respect to FIGS. 4-11.

Figure 4:
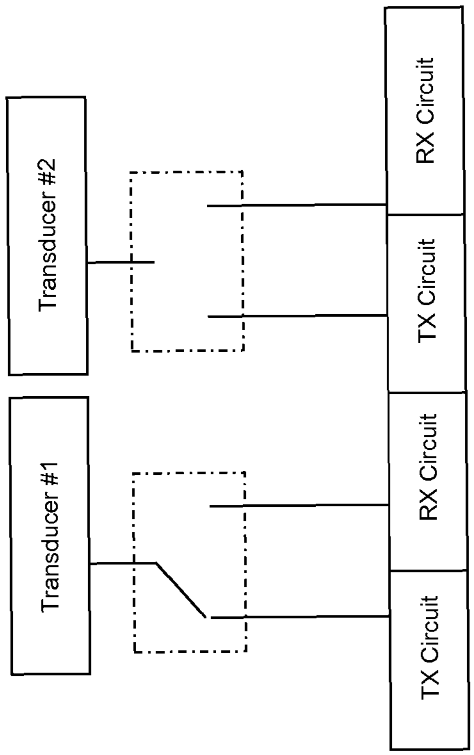
FIG. 4 illustrates a first transmit-only operating mode for an acoustic transducer module.

FIG. 4 illustrates a first transmit-only operating mode for an acoustic transducer device. In the operating mode shown in FIG. 4, only the first acoustic transducer is connected to a transducer driver. Beneficially, the second acoustic transducer may be left disconnected. The operating mode shown in FIG. 4 may be employed if an application requires only a small TX acoustic power output, but electrical power consumption by the device is a primary concern. In that case, the power supply may be disconnected from the unused transducer driver.

Figure 5:
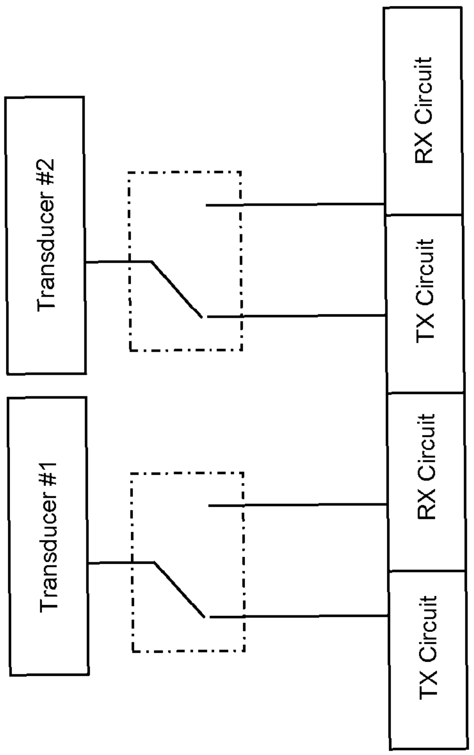
FIG. 5 illustrates a second transmit-only operating mode for an acoustic transducer module.

FIG. 5 illustrates a second transmit-only operating mode for an acoustic transducer device. In the operating mode shown in FIG. 5, both the first and second acoustic transducers are connected to transducer drivers. As noted above, in some embodiments the device may have only a single transducer driver to which the first and second acoustic transducers are connected in parallel or series. The operating mode shown in FIG. 5 may be employed if an application requires more transmitted acoustic power than can be produced by a single one of the acoustic transducers.

Figure 6:
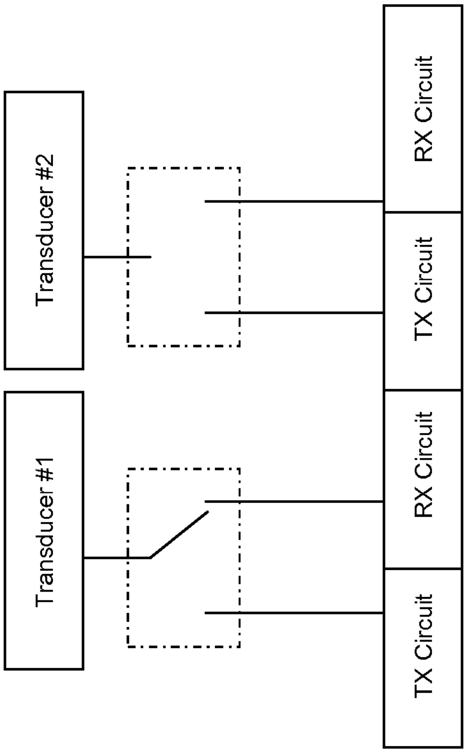
FIG. 6 illustrates a first receive-only operating mode for an acoustic transducer module.

FIG. 6 illustrates a first receive-only operating mode for an acoustic transducer device. In the operating mode shown in FIG. 6, only the first acoustic transducer is connected to a signal receiver. Beneficially, the second acoustic transducer may be left disconnected. The operating mode shown in FIG. 6 may be employed if an application requires the lowest power consumption and the current receive sensitivity from a single acoustic transducer is suitable. In that case, the power supply may be disconnected from the unused signal receiver.

Figure 7:
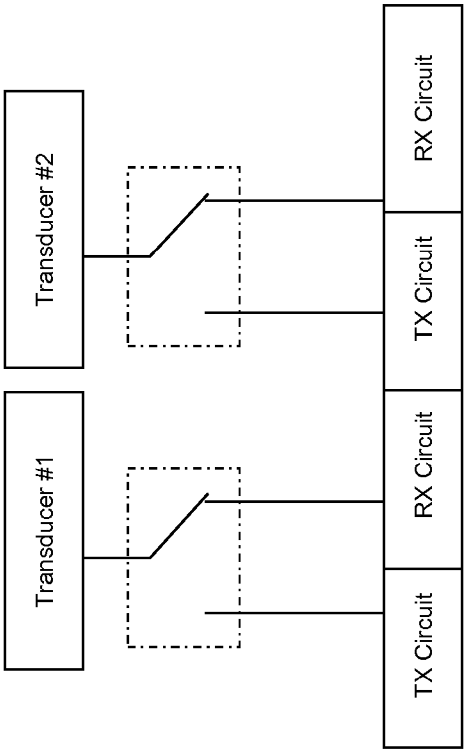
FIG. 7 illustrates a second receive-only operating mode for an acoustic transducer module.

FIG. 7 illustrates a second receive-only operating mode for an acoustic transducer device. In the operating mode shown in FIG. 7, both the first and second acoustic transducers are connected to signal receivers. The operating mode shown in FIG. 7 may be employed if an application requires the best sensitivity.

Figure 8:
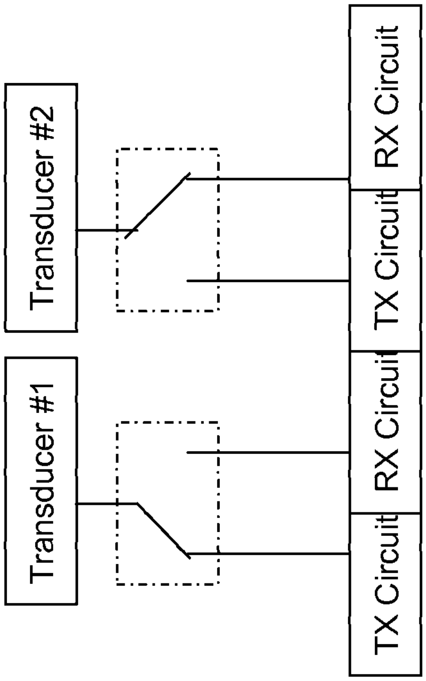
FIG. 8 illustrates another operating mode for an acoustic transducer module.

FIG. 8 illustrates another operating mode for an acoustic transducer device. In the operating mode shown in FIG. 8, first acoustic transducer is connected to a transducer driver, and second acoustic transducer is connected to a signal receiver. The first acoustic transducer transmits an acoustic wave and the second acoustic transducer receives the return or echo acoustic wave. The operating mode illustrated in FIG. 8 may be employed in a so-called "pitch-catch" or "pulse-echo" system.

Figure 9A:
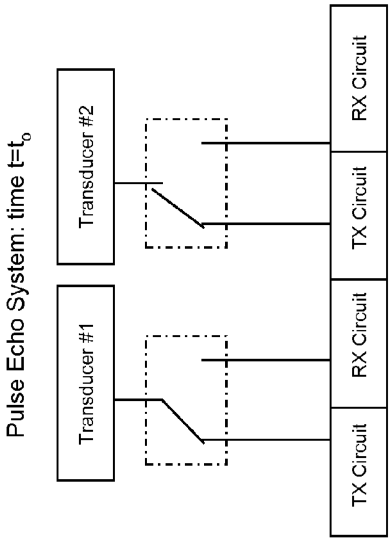
FIGS. 9A-B illustrate a pulse-echo operating mode for an acoustic transducer module.
Figure 9B:
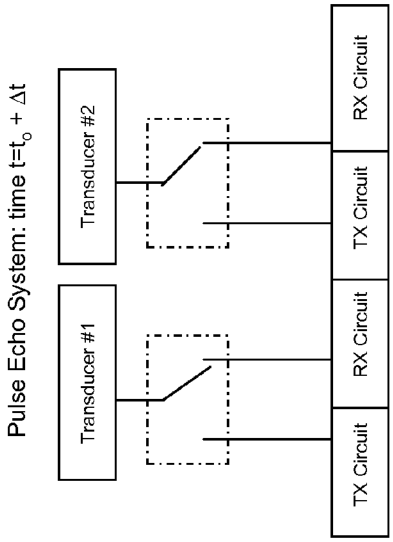

FIGS. 9A-B illustrate other "pulse-echo" operating modes for an acoustic transducer device. As shown in FIG. 9A, at a time t=t0, both the first and second acoustic transducers are connected to transducer drivers to transmit an acoustic wave. Subsequently, at time t=t0+Δt, both the first and second acoustic transducers are connected to signal receivers to receive and process the return acoustic wave.

Figure 10A:
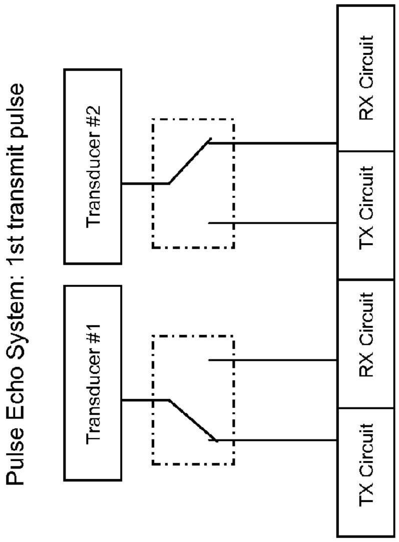
FIGS. 10A-B illustrate another pulse-echo operating mode for an acoustic transducer module.
Figure 10B:
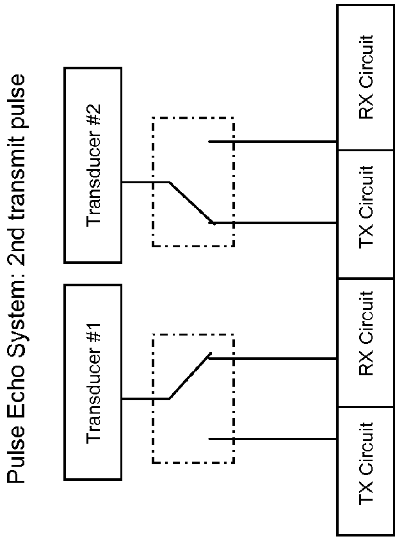

FIGS. 10A-B illustrate another pulse-echo operating mode for an acoustic transducer device. In the operating mode illustrated in FIGS. 10A-B, the arrangement of acoustic transducers to transmit and receive acoustic pulses is changed for alternating acoustic pulses to eliminate possible offset parameters between the two halves of the device. More specifically, as shown in FIG. 10A, for a first acoustic pulse the first acoustic transducer transmits the acoustic wave and the second acoustic transducer receives the return acoustic wave. Then, as shown in FIG. 10B, for a second acoustic pulse the second acoustic transducer transmits the acoustic wave and the first acoustic transducer receives the return acoustic wave.

Figure 11A:
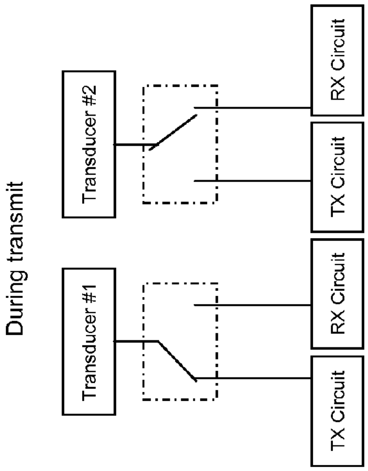
FIGS. 11A-D illustrates one example of changing an operating mode of an acoustic transducer device in response to a transducer failure.
Figure 11B:
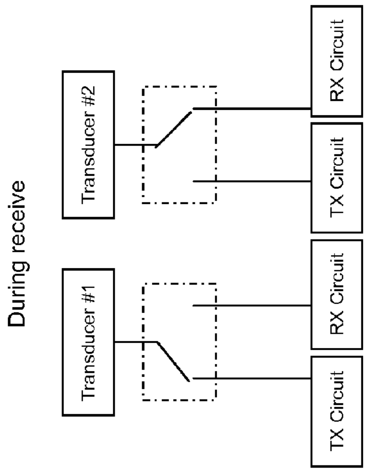
Figure 11C:
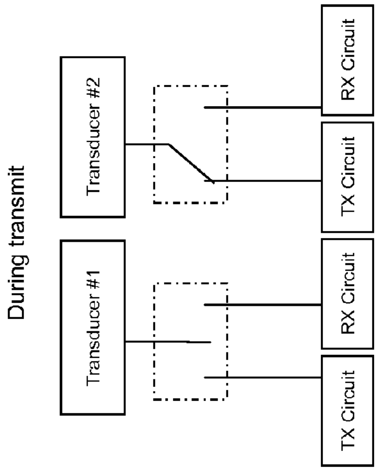
Figure 11D:
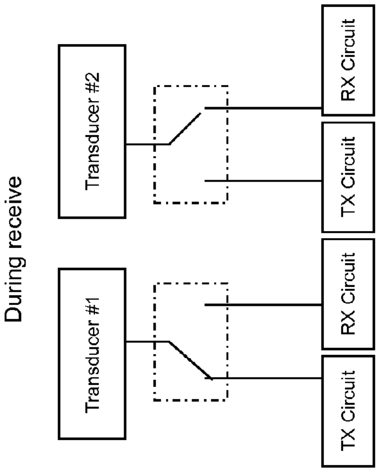

FIGS. 11A-D illustrates one example of changing an operating mode of an acoustic transducer device in response to a transducer failure. FIGS. 11A-B illustrate an initial operating mode like that shown in FIG. 8 above. FIG. 11A illustrates the transmit cycle and FIG. 11B illustrates the receive cycle. Now at some point, let the first acoustic transducer fail or become defective. In that case, the acoustic transducer device is able to reconfigure itself to a new operating mode, illustrated in FIGS. 11C-D. In the operating mode illustrated in FIGS. 11C-D, the first acoustic transducer is no longer utilized, and the second acoustic transducer is configured to be connected to the second transducer driver during a transmit cycle, and to be connected to the second signal receiver during a receive cycle. The failed first acoustic transducer may be left connected to the first transducer driver or the first signal receiver, or may be left disconnected.

Although for illustration purposes, FIGS. 4-11 shown several possible operating modes, it is understood that other operating modes may be possible for a given embodiment of an acoustic transducer device such as the embodiments illustrated in FIGS. 1 and 2. One example occurs when a diagnostic circuit is provided for the acoustic transducer device. Examples of such diagnostic operations are disclosed in U.S. patent application Ser. No. 12/402,600 filed on 12 Mar. 2009 in the names of Steve Martin et al., the contents of which are hereby incorporated by reference herein. In such a case, in one embodiment, in normal operation the first acoustic transducer is configured in a normal transmit, receive or transmit/receive mode, and the second acoustic transducer is configured as a diagnostic device. If the first acoustic transducer fails, or if there is a desire for more power, then the second acoustic transducer may be dynamically reconfigured to operate in the normal transmit, receive or transmit/receive mode, or in a switched mode between diagnostics and transmit, receive or transmit/receive.

In one or more embodiments described above, an operating mode may be selected by an end-user of the acoustic transducer device after the device has been manufactured and deployed into the field. Indeed, in some embodiments an end-user may dynamically change operating modes for the device as application requirements change.

While example embodiments are disclosed herein, one of ordinary skill in the art appreciates that many variations that are in accordance with the present teachings are possible and remain within the scope of the appended claims. After a careful reading of the teachings of this specification and the drawings provided together herewith, such variations would be recognized by those of skill in the art. The embodiments therefore are not to be restricted except within the scope of the appended claims.

The invention claimed is:

1. A device, comprising:
- a first acoustic transducer;
- a second acoustic transducer;
- a first transducer driver;
- a second transducer driver;
- a first signal receiver;
- a second signal receiver;
- a first switching device having a first terminal connected to the first transducer driver, a second terminal connected to the first signal receiver, and a common terminal connected to the first acoustic transducer;
- a second switching device having a first terminal connected to the second transducer driver, a second terminal connected to the second signal receiver, and a common terminal connected to the second acoustic transducer;
- a first transducer configuration storage device configured to select a configuration of the first switching device;
- a second transducer configuration storage device configured to select a configuration of the second switching device, wherein the first and second acoustic transducers, the first and second signal receivers, the first and second switching devices, and the first and second transducer configuration storage devices are all included within a same housing.

2. The device of claim 1, wherein the first and second transducer configuration storage devices each comprise a nonvolatile memory device.

3. The device of claim 1, wherein the first and second transducer configuration storage devices each comprise a volatile memory device.

4. The device of claim 1, wherein the first and second transducer configuration storage devices each comprise a fuse.

5. The device of claim 1, further comprising:
- a supply voltage switching device receiving a supply voltage and being adapted to selectively connect the supply voltage to one or more of the first and second transducer drivers and the first and second signal receivers; and
- a supply voltage configuration storage device configured to select a configuration of the supply voltage switching device.

6. The device of claim 1, wherein the selected configuration of the first storage device causes the first switching device to connect the first acoustic transducer to the first transducer driver, and causes the second switching device to connect the second acoustic transducer to the second transducer driver.

7. The device of claim 1, wherein the selected configuration of the first storage device causes the first switching device to connect the first acoustic transducer to the first transducer driver, and causes the second switching device to disconnect the second acoustic transducer from both the second transducer driver and the second signal receiver.

8. The device of claim 1, wherein the selected configuration of the first storage device causes the first switching device to connect the first acoustic transducer to the first signal receiver, and causes the second switching device to connect the second acoustic transducer to the second signal receiver.

9. The device of claim 1, wherein the selected configuration of the first storage device causes the first switching device to connect the first acoustic transducer to the first signal receiver, and causes the second switching device to disconnect the second acoustic transducer from both the second transducer driver and the second signal receiver.

10. A device, comprising:

a first acoustic transducer;

a second acoustic transducer;

one or more transducer drivers;

one or more signal receivers; and a transducer configuration device for selectively configuring connections between: (1) at least one of the first and second acoustic transducers; and (2) the one or more transducer drivers and the one or more signal receivers, according to a selected operating mode for the device among a plurality of possible operating modes, comprising:

a pitch-catch operating mode wherein a probing acoustic signal is transmitted by the first transducer and a corresponding returning acoustic signal is received by the second transducer.

11. The device of claim 10, wherein the plurality of possible operating modes of the device include:

a first receive-only operating mode wherein only the first transducer receives an acoustic signal;

a second receive-only operating mode wherein the first and second transducers each receive an acoustic signal;

a first transmit-only operating mode wherein only the first transducer transmits an acoustic signal;

a second transmit-only operating mode wherein the first and second transducers each transmit an acoustic signal; and a pulse-echo operating mode wherein a probing acoustic signal is transmitted by at least one transducer and a corresponding returning acoustic signal is received by a same transducer as transmitted the probing acoustic signal.

12. The device of claim 10, wherein the device includes one or more configuration inputs and wherein the selected operating mode is determined by one or more voltages applied to the configuration inputs.

13. The device of claim 10, wherein the device includes one or more fuses internal to the device, and wherein the selected operating mode is determined by states of the one or more fuses.

14. The device of claim 10, wherein the device includes a nonvolatile memory device storing one or more values that identify the selected operating mode of the device.

15. The device of claim 10, wherein the transducer configuration device is adapted to reconfigure connections between: (1) at least one of the first and second acoustic transducers; and (2) at least one of the one or more transducer drivers and the one or more signal receivers, in response to one of the transducers failing.

16. The device of claim 10, further including a power supply configuration device for selectively connecting a supply voltage to the one or more transducer drivers and the one or more signal receivers, according to the selected operating mode of the device.

17. A method of operating an acoustic transducer device having: a first acoustic transducer, a second acoustic transducer, one or more transducer drivers, and one or more signal receivers, the method comprising:

determining a selected operating mode for the acoustic transducer device among a plurality of possible operating modes for which the acoustic transducer device could be configured, wherein said determining is based on one of: (1) an operating mode selection device internal to the acoustic transducer device, and (2) one or more voltages applied to configuration inputs of the acoustic transducer device; and selectively configuring connections between: (1) at least one of the first and second acoustic transducers; and (2) the one or more transducer drivers and the one or more signal receivers, according to the selected operating mode, wherein the plurality of possible operating modes of the device comprises:

a pitch catch operating mode wherein a probing acoustic signal is transmitted by the first transducer and a corresponding returning acoustic signal is received by the second transducer.

18. The method of claim 17, wherein the plurality of possible operating modes of the device include:

a first receive-only operating mode wherein only the first transducer receives an acoustic signal;

a second receive-only operating mode wherein the first and second transducers each receive an acoustic signal;

a first transmit-only operating mode wherein only the first transducer transmits an acoustic signal;

a second transmit-only operating mode wherein the first and second transducers each transmit an acoustic signal; and a pulse echo operating mode wherein a probing acoustic signal is transmitted by at least one transducer and a corresponding returning acoustic signal is received by a same transducer as transmitted the probing acoustic signal.

19. The method of claim 17, wherein the operating mode selection device comprises one or more fuses internal to the acoustic transducer device, and wherein the selected operating mode is determined by states of the one or more fuses.

20. The method of claim 17, wherein the operating mode selection device comprises a nonvolatile memory device, and wherein the selected operating mode is determined by one or more values stored in the nonvolatile memory device.

* * * * *